(12) United States Patent
Akiyama (10) Patent No.: US 9,942,528 B2
(45) Date of Patent: Apr. 10, 2018

(54) WAVELENGTH CONVERSION ELEMENT, ILLUMINATION DEVICE, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/425,546

(22) Filed: Feb. 6, 2017

(65) Prior Publication Data

US 2017/0237953 A1    Aug. 17, 2017

(30) Foreign Application Priority Data

Feb. 12, 2016    (JP) ................. 2016-025165

(51) Int. Cl.
 *H04N 9/31*     (2006.01)
 *G02B 26/00*    (2006.01)
 *G02B 27/14*    (2006.01)
 *G03B 21/20*    (2006.01)

(52) U.S. Cl.
 CPC ......... *H04N 9/3114* (2013.01); *G02B 26/008* (2013.01); *G02B 27/141* (2013.01); *G02B 27/145* (2013.01); *G03B 21/204* (2013.01); *H04N 9/3194* (2013.01)

(58) Field of Classification Search
 CPC  G03B 21/204; G03B 21/208; G03B 21/2013; G03B 21/2066; G03B 21/2073; F21V 13/06; F21V 13/08; F21V 13/14
 See application file for complete search history.

(56) References Cited

U.S. PATENT DOCUMENTS

| 2010/0328632 | A1* | 12/2010 | Kurosaki | G03B 21/204 353/98 |
| 2011/0116253 | A1  | 5/2011  | Sugiyama | |
| 2013/0088689 | A1* | 4/2013  | Lin | G03B 21/204 353/31 |
| 2014/0104583 | A1  | 4/2014  | Osaka | |
| 2016/0077326 | A1* | 3/2016  | Yamagishi | G02B 26/008 353/61 |
| 2016/0077415 | A1* | 3/2016  | Motoya | G03B 21/204 353/84 |
| 2016/0223893 | A1* | 8/2016  | Okuda | H04N 9/3161 |

FOREIGN PATENT DOCUMENTS

| JP | 2011-113779 A | 6/2011 |
| JP | 2012-181394 A | 9/2012 |
| WO | 2012/172672 A1 | 12/2012 |

* cited by examiner

*Primary Examiner* — Sultan Chowdhury
(74) *Attorney, Agent, or Firm* — Oliff PLC (57) ABSTRACT

The invention relates to a wavelength conversion element including: a substrate including a light-reflecting surface and rotatable around an axis of rotation; and a wavelength conversion layer supported by the light-reflecting surface. The wavelength conversion layer has a distribution of reflectance, along a circle centered on the axis of rotation, with respect to excitation light to excite the wavelength conversion layer. An average reflectance of the wavelength conversion layer with respect to the excitation light per the circle varies depending on a radius of the circle.

15 Claims, 6 Drawing Sheets

WAVELENGTH CONVERSION ELEMENT, ILLUMINATION DEVICE, AND PROJECTOR

BACKGROUND

1. Technical Field

The present invention relates to a wavelength conversion element, an illumination device, and a projector.

2. Related Art

As an illumination device, a technique for producing white illumination light by mixing fluorescence emitted from a phosphor that is excited by excitation light emitted from a solid-state light source such as an LED and portion of the excitation light has been known (e.g., see JP-A-2011-113779).

The illumination device includes two kinds of phosphor regions having different phosphor optical densities. The boundary line between the two kinds of phosphor regions is curved; therefore, when an arc with a certain radius is drawn centered on the axis of rotation, the ratio of the lengths of arcs corresponding to the two kinds of phosphor regions varies depending on the radius. Therefore, the illumination device can adjust white balance by shifting the irradiation position of the excitation light in the radial direction.

In the illumination device, however, since the step of processing the respective shapes of the two kinds of phosphor layers is needed, the manufacturing process is complicated.

SUMMARY

An advantage of some aspects of the invention is to provide a wavelength conversion element, an illumination device, and a projector each capable of adjusting white balance with a simple configuration.

A first aspect of the invention provides a wavelength conversion element including: a substrate including a light-reflecting surface and rotatable around an axis of rotation; and a wavelength conversion layer supported by the light-reflecting surface, the wavelength conversion layer having a distribution of reflectance, along a circle centered on the axis of rotation, with respect to excitation light to excite the wavelength conversion layer, an average reflectance of the wavelength conversion layer with respect to the excitation light per the circle varying depending on a radius of the circle.

According to the wavelength conversion element according to the first aspect, the color balance of light emitted from the wavelength conversion layer can be adjusted by moving the incident position of the excitation light in the radial direction of the circle. Thus, since it is not necessary to use a combination of plural kinds of phosphor layers as the wavelength conversion layer, the configuration of the wavelength conversion layer can be simplified.

In the first aspect, it is preferable that the wavelength conversion layer includes, along the circle, a high reflectance region and a low reflectance region where the reflectance is smaller than that of the high reflectance region, and that a proportion of the high reflectance region per the circle and a proportion of the low reflectance region per the circle vary depending on the radius of the circle.

According to this configuration, the average reflectance per circle can be varied simply and reliably.

In the first aspect, it is preferable that a straight line including a boundary between the high reflectance region and the low reflectance region passes through a point different from a center of the circle.

According to this configuration, a configuration for varying the average reflectance per circle can be easily realized.

In the first aspect, it is preferable that the wavelength conversion layer includes, in the high reflectance region, a first dichroic layer provided on the side of the wavelength conversion layer opposite to the light-reflecting surface, and that the first dichroic layer reflects portion of the excitation light and transmits fluorescence produced by the wavelength conversion layer.

According to this configuration, it is possible to favorably emit the fluorescence to the outside with the first dichroic layer while reflecting the excitation light with high reflectance in the high reflection region.

In the first aspect, it is preferable that the wavelength conversion layer includes, in the low reflectance region, a second dichroic layer provided on the side of the wavelength conversion layer opposite to the light-reflecting surface, and that the second dichroic layer reflects portion of the excitation light and transmits the fluorescence.

According to this configuration, it is possible to favorably emit the fluorescence to the outside with the second dichroic layer while reflecting the excitation light with low reflectance in the low reflection region.

Moreover, it is easy to adjust the average reflectance per circle by adjusting the reflectance of each of the low reflection region and the high reflection region.

A second aspect of the invention provides an illumination device including: the wavelength conversion element according to the first aspect; a first drive device rotating the substrate around the axis of rotation; a second drive device moving the substrate in a direction crossing the axis of rotation; and a light-emitting element emitting the excitation light to be incident on the wavelength conversion layer, the illumination device emitting illumination light including a component of portion of the excitation light reflected by the wavelength conversion layer and fluorescence produced by the wavelength conversion layer.

According to the illumination device according to the second aspect, the color balance of the illumination light can be adjusted simply and reliably by moving the substrate with the second drive device.

In the second aspect, it is preferable that the illumination device further includes: a detection section detecting a light amount of the illumination light; and a controller controlling the second drive device based on a detection result of the detection section.

According to this configuration, the color balance of the illumination light can remain constant.

A third aspect of the invention provides a projector including: the illumination device according to the second aspect; a light modulator modulating light from the illumination device in response to image information to thereby form image light; and a projection optical system projecting the image light.

Since the projector according to the third aspect includes the illumination device according to the second aspect, display with white balance remaining constant can be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the drawings. In the drawings used in the following description, a characteristic portion may be shown in an enlarged manner, for convenience sake, to facilitate understanding thereof, and thus the dimension ratio and the like of each component are not always the same as actual ones.

Figure 1:
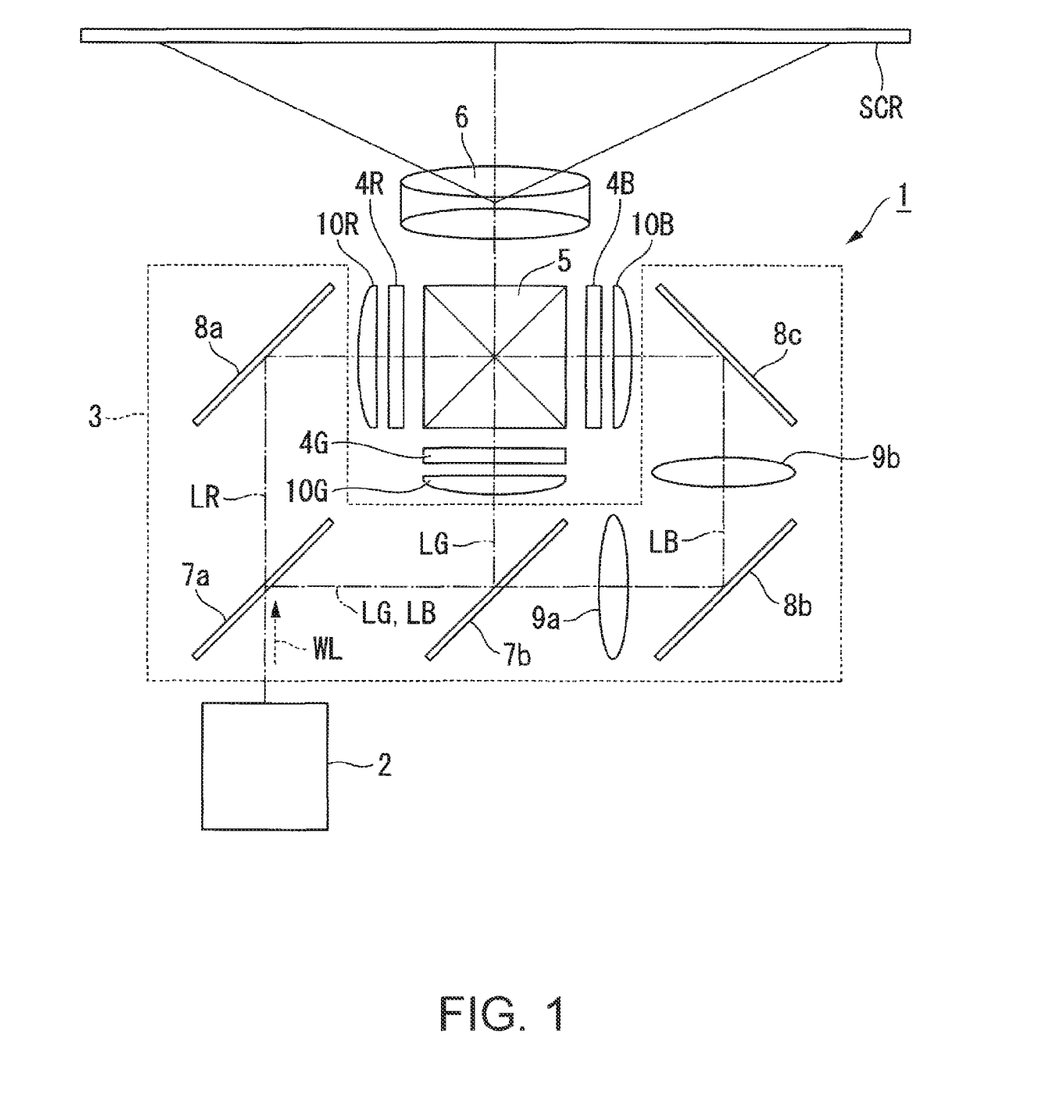
FIG. 1 is a schematic configuration diagram of a projector.

FIG. 1 is a schematic configuration diagram of a projector of an embodiment. An illumination device as one embodiment of the invention is used for the projector of the embodiment. Moreover, a wavelength conversion element as one embodiment of the invention is used for the illumination device of the embodiment.

As shown in FIG. 1, the projector 1 of the embodiment is a projection-type image display device that displays a color image on a screen SCR. The projector 1 uses three light modulators corresponding to respective colored lights: red light LR, green light LG, and blue light LB. The projector 1 uses, as a light source of an illumination device 2, a semiconductor laser from which high-luminance, high-output light is obtained.

The projector 1 roughly includes the illumination device 2, a color separation optical system 3, a light modulator 4R for red light, a light modulator 4G for green light, a light modulator 4B for blue light, a combining optical system 5, and a projection optical system 6.

The illumination device 2 emits white illumination light WL toward the color separation optical system 3.

The color separation optical system 3 separates the illumination light WL emitted from the illumination device 2 into the red light LR, the green light LG, and the blue light LB. The color separation optical system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a has the function of separating the illumination light WL emitted from the illumination device 2 into the red light LR, and the green light LG and the blue light LB. The first dichroic mirror 7a transmits the red light LR and reflects the green light LG and the blue light LB. The second dichroic mirror 7b has the function of separating the light reflected by the first dichroic mirror 7a into the green light LG and the blue light LB. The second dichroic mirror 7b reflects the green light LG and transmits the blue light LB.

The first reflection mirror 8a is disposed on the optical path of the red light LR. The first reflection mirror 8a reflects the red light LR transmitted through the first dichroic mirror 7a toward the light modulator 4R for red light. The second reflection mirror 8b and the third reflection mirror 8c are disposed on the optical path of the blue light LB. The second reflection mirror 8b and the third reflection mirror 8c reflect the blue light LB transmitted through the second dichroic mirror 7b toward the light modulator 4B for blue light. The green light LG is reflected by the second dichroic mirror 7b and then travels toward the light modulator 4G for green light.

The first relay lens 9a and the second relay lens 9b are disposed on the light-exiting side of the second dichroic mirror 7b on the optical path of the blue light LB. The first relay lens 9a and the second relay lens 9b have the function of compensating for light loss of the blue light LB due to the fact that the optical path length of the blue light LB is longer than the optical path length of the red light LR or the green light LG.

The light modulator 4R for red light modulates the red light LR in response to image information to form image light corresponding to the red light LR. The light modulator 4G for green light modulates the green light LG in response to image information to form image light corresponding to the green light LG. The light modulator 4B for blue light modulates the blue light LB in response to image information to form image light corresponding to the blue light LB.

For example, a transmissive liquid crystal panel is used for the light modulator 4R for red light, the light modulator 4G for green light, and the light modulator 4B for blue light. A pair of polarizers (not shown) are disposed on the incident and exiting sides of the liquid crystal panel. The polarizer transmits linearly polarized light in a specific direction.

A field lens 10R is disposed on the incident side of the light modulator 4R for red light. A field lens 10G is disposed on the incident side of the light modulator 4G for green light. A field lens 10B is disposed on the incident side of the light modulator 4B for blue light. The field lens 10R collimates the red light LR to be incident on the light modulator 4R for red light. The field lens 10G collimates the green light LG to be incident on the light modulator 4G for green light. The field lens 10B collimates the blue light LB to be incident on the light modulator 4B for blue light.

The combining optical system 5 combines the image lights corresponding to the red light LR, the green light LG, and the blue light LB, and emits the combined image light toward the projection optical system 6. For example, across dichroic prism is used for the combining optical system 5.

The projection optical system 6 is composed of a projection lens group including a plurality of projection lenses. The projection optical system 6 enlarges and projects the image light combined by the combining optical system 5 onto the screen SCR. With this configuration, an enlarged color image is displayed on the screen SCR.

Subsequently, the illumination device 2 will be described.

Figure 2:
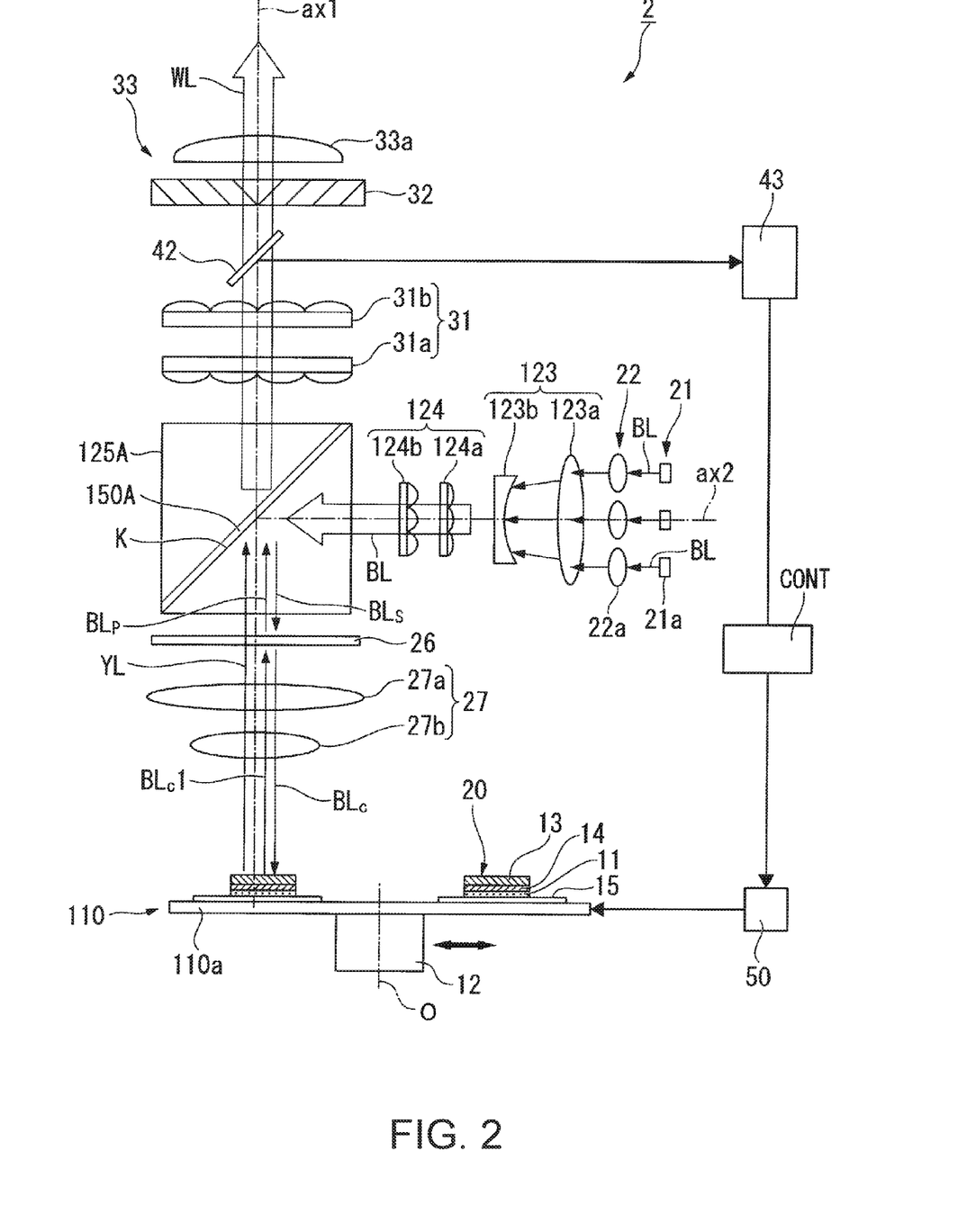
FIG. 2 is a diagram showing a schematic configuration of an illumination device.

FIG. 2 is a diagram showing a schematic configuration of the illumination device 2. As shown in FIG. 2, the illumination device 2 includes an array light source 21, a collimator optical system 22, an a focal optical system 123, a homogenizer optical system 124, an optical element 125A including a polarization separation element 150A, a retardation film 26, a pickup optical system 27, an integrator optical system 31, a polarization conversion element 32, a superimposing optical system 33, a phosphor wheel 110, a light-amount monitoring mirror 42, a sensor unit (detection section) 43, a drive device 50, and a controller CONT. The phosphor wheel 110 corresponds to "wavelength conversion element" in the appended claims.

The array light source 21 includes a plurality of semiconductor lasers 21a that are arranged. Specifically, the array light source 21 is composed of the plurality of semiconductor lasers 21a arranged in an array in a plane orthogonal to the optical axis. The number of the semiconductor lasers 21a is not particularly limited. The semiconductor laser 21a emits, for example, excitation light BL including laser light at a peak wavelength of 450 nm. The semiconductor laser corresponds to "light-emitting element" in the appended claims.

In the embodiment, the optical axis of the array light source 21 is defined as an optical axis ax2. The optical axis of light emitted from the phosphor wheel 110, to be described later, is defined as an optical axis ax1. The optical axis ax2 and the optical axis ax1 lie in the same plane and are orthogonal to each other.

The array light source 21, the collimator optical system 22, the afocal optical system 123, the homogenizer optical system 124, and the optical element 125A are aligned in this order on the optical axis ax2. On the other hand, the phosphor wheel 110, the pickup optical system 27, the retardation film 26, the optical element 125A, the integrator optical system 31, the polarization conversion element 32, and the superimposing optical system 33 are aligned in this order on the optical axis ax1.

In the embodiment, the excitation light BL emitted by each of the semiconductor lasers 21a is S-polarized light reflected by the polarization separation element 150A. The excitation lights BL emitted from the array light source 21 are incident on the collimator optical system 22.

The collimator optical system 22 converts the excitation light BL emitted from the semiconductor laser 21a to a parallel light beam. The collimator optical system 22 is composed of, for example, a plurality of collimator lenses 22a arranged in an array. The plurality of collimator lenses 22a are disposed in one-to-one correspondence with the plurality of semiconductor lasers 21a.

The excitation light BL transmitted through the collimator optical system 22 is incident on the afocal optical system 123.

The afocal optical system 123 adjusts the size (spot diameter) of the excitation light BL, and is composed of, for example, two afocal lenses 123a and 123b. The excitation light BL transmitted through the afocal optical system 123 is incident on the homogenizer optical system 124.

The homogenizer optical system 124 converts the light intensity distribution of the excitation light BL into a uniform state (so-called top-hat distribution) in the region to be illuminated, and includes, for example, a pair of multi-lens arrays 124a and 124b. The excitation light BL emitted through the homogenizer optical system 124 is incident on the optical element 125A.

The optical element 125A includes, for example, a dichroic prism having wavelength selectivity. The dichroic prism includes an inclined surface K at an angle of 45° relative to the optical axis ax2. The inclined surface K is at an angle of 45° relative to the optical axis ax1. The polarization separation element 150A having wavelength selectivity is provided on the inclined surface K.

The polarization separation element 150A reflects the excitation light BL as S-polarized light.

Moreover, the polarization separation element 150A has a color separation function of transmitting light (fluorescent light YL) in a second wavelength band different from the first wavelength band, irrespective of the polarization state. The optical element 125A is not limited to one having a prismatic shape such as a dichroic prism, but a dichroic mirror having a parallel-plate shape may be used.

Then, the excitation light BL that is S-polarized light incident on the polarization separation element 150A is reflected as excitation light BLs toward the phosphor wheel 110.

The retardation film 26 includes a ¼-wave plate disposed on the optical path between the polarization separation element 150A and a phosphor layer 11 of the phosphor wheel 110. The S-polarized excitation light BLs incident on the retardation film 26 is converted to circularly polarized excitation light BLc, and then incident on the pickup optical system 27.

The pickup optical system 27 concentrates the excitation light BLc onto the phosphor layer 11, and is composed of, for example, a pickup lens 27a and a pickup lens 27b.

The phosphor wheel 110 of the embodiment is a so-called reflective rotating fluorescent plate.

The phosphor wheel 110 includes a substrate 110a having a circular plate shape, a wavelength conversion layer supported by the substrate 110a, and a motor 12 that rotatably drives the substrate 110a around an axis O of rotation passing through the center of the substrate 110a. Although the shape of the substrate 110a is a circular plate shape in the embodiment, the shape of the substrate 110a is not limited to the circular plate shape. The motor 12 corresponds to "first drive device" in the appended claims.

In the embodiment, a light-reflecting surface 15 is formed on a major surface of the substrate 110a. The light-reflecting surface 15 is provided in at least a support region for the wavelength conversion layer 20 in the substrate 110a. The light-reflecting surface 15 is composed of, for example, an Ag film or the like.

The wavelength conversion layer 20 is provided in a ring shape around the axis O of rotation. The wavelength conversion layer 20 includes the phosphor layer 11 and a dichroic film 13 provided on a surface (upper surface) of the phosphor layer 11 on the side opposite to the substrate 110a.

The phosphor layer 11 is provided in a ring shape around the axis O of rotation and includes phosphor particles that emit fluorescence. The phosphor layer 11 absorbs the excitation light BLc (blue light) and converts the excitation light BLc to yellow fluorescent light YL. The phosphor particle is a particulate fluorescent substance that absorbs the excitation light BLc and emits fluorescence. For example, the phosphor particle contains a substance that emits fluorescence in response to excitation by blue light at a wavelength of approximately 450 nm, and converts the excitation light BLc to the yellow fluorescent light YL and emits the yellow fluorescent light YL.

As the phosphor particle, a generally known yttrium-aluminum-garnet (YAG) based phosphor can be used, but the phosphor particle is not limited to this. Moreover, a ceramic phosphor layer may be used as the phosphor layer 11.

In the embodiment, a diffusion section 14 is formed on the surface of the phosphor layer 11. The diffusion section 14 includes a concavo-convex structure formed on the surface of the phosphor layer 11. Therefore, the dichroic film 13 formed on the diffusion section 14 has a surface shape reflecting the concavities and convexities of the concavo-convex structure.

The dichroic film 13 reflects portion of the blue excitation light BLc toward the pickup optical system 27 and transmits the yellow fluorescent light YL. Portion of the excitation light BLc incident on the phosphor wheel 110 is reflected by the dichroic film 13 and directed to the pickup optical system 27. The excitation light BLc reflected by the dichroic film 13 is diffusely reflected due to the concavo-convex shape caused by the diffusion section 14. On the other hand, portion of the excitation light BLc transmitted through the dichroic film 13 is incident on the phosphor layer 11.

The portion of the excitation light BLc incident on the phosphor layer 11 is converted to the fluorescent light YL by the phosphor particles. The fluorescent light YL is emitted from the phosphor layer 11, directly or after being reflected by the light-reflecting surface 15, through the dichroic film 13 to the outside. In this manner, the fluorescent light YL is emitted from the phosphor layer 11 toward the pickup optical system 27.

The excitation light BLc that is not converted to the fluorescent light YL, even though the proportion is considerably less, is reflected by the light-reflecting surface 15, diffused by the diffusion section 14, and transmits again through the pickup optical system 27 and the retardation film 26.

Since the excitation light BLc emitted from the phosphor wheel 110 is diffused by the diffusion section 14, the illuminance distribution of the excitation light BLc is made uniform and thus close to the illuminance distribution of the fluorescent light YL. Therefore, color unevenness in the illumination light WL is reduced.

Moreover, the excitation light BLc (hereinafter referred to as "blue light BLc1") emitted from the phosphor wheel 110 toward the pickup optical system 27 is converted by the retardation film 26 to P-polarized light BLp that can transmit through the polarization separation element 150A.

The substrate 110a rotates at a predetermined number of revolutions in the use of the projector 1. This prevents the excitation light BL from being continuously incident on a specific region of the phosphor layer 11, and therefore, longer life of the phosphor layer 11 is achieved.

The fluorescent light YL emitted from the phosphor layer 11 toward the polarization separation element 150A passes through the pickup optical system 27 and the retardation film 26. The fluorescent light YL is unpolarized light and therefore incident on the polarization separation element 150A while remaining unpolarized. Then, the fluorescent light YL transmits through the polarization separation element 150A.

The light BLp in blue (hereinafter referred to as "blue light BLp") transmitted through the polarization separation element 150A is mixed with the yellow fluorescent light YL, so that the illumination light (white light) WL is obtained. After transmitting through the polarization separation element 150A, the illumination light WL is incident on the integrator optical system 31.

The integrator optical system 31 divides the illumination light WL into a plurality of small light beams. The integrator optical system 31 is composed of, for example, a first lens array 31a and a second lens array 31b. The first lens array 31a and the second lens array 31b each include a plurality of lenses arranged in an array.

The illumination light WL emitted through the integrator optical system 31 is incident on the polarization conversion element 32. The polarization conversion element 32 aligns the polarization direction of the illumination light WL. The polarization conversion element 32 is composed of, for example, a polarization separation film, a retardation film, and a mirror. For aligning the polarization direction of the fluorescent light YL as unpolarized light with the polarization direction of the blue light BLp, the polarization conversion element 32 converts one of polarization components to the other polarization component, for example, converts a P-polarization component to an S-polarization component.

The illumination device 2 having the configuration described above emits the white illumination light WL.

The light-amount monitoring mirror 42 is provided on the optical path between the integrator optical system 31 and the polarization conversion element 32. The light-amount monitoring mirror 42 is disposed at an angle of 45° relative to the optical axis ax1. The light-amount monitoring mirror transmits portion of incident light and reflects the remaining portion thereof. The light transmitted through the light-amount monitoring mirror 42 is incident on the polarization conversion element 32, while the light reflected by the light-amount monitoring mirror 42 is incident on the sensor unit 43. A detailed configuration of the sensor unit 43 will be described later.

Figure 3:
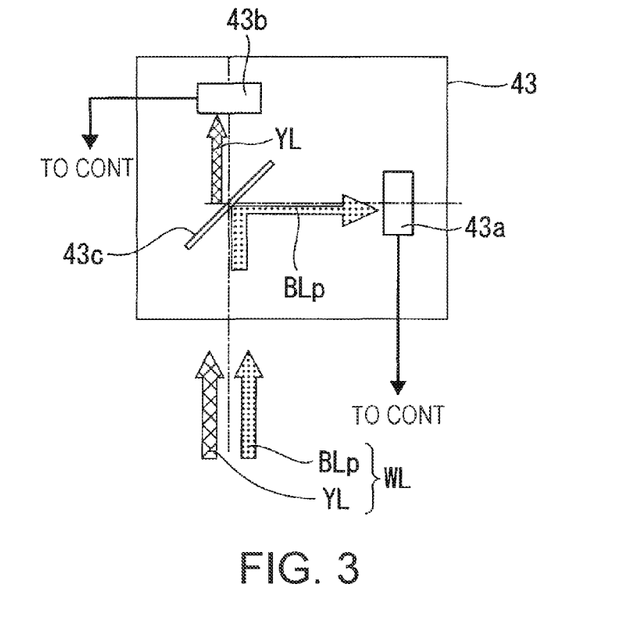
FIG. 3 is a diagram showing a schematic configuration of a sensor unit.
Figure 4:
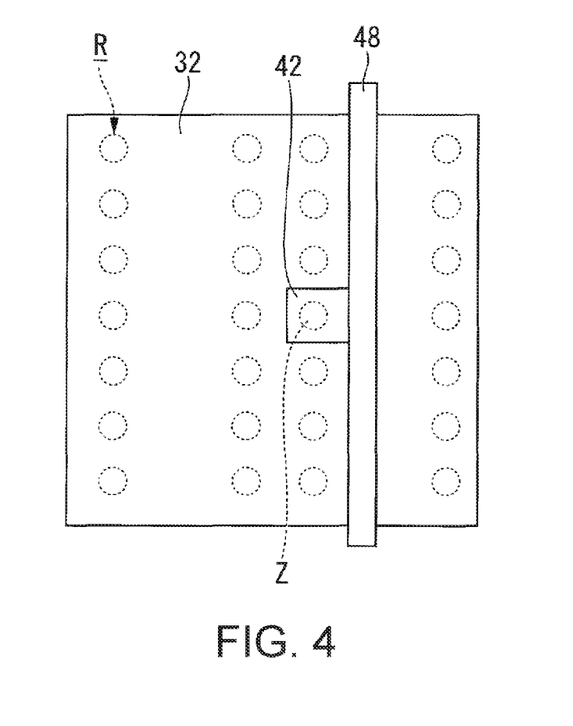
FIG. 4 is an elevation view showing the arrangement of a mirror in a polarization conversion element.

FIG. 3 is a diagram showing a schematic configuration of the sensor unit 43. FIG. 4 is an elevation view showing the arrangement of the mirror in the polarization conversion element.

As shown in FIG. 3, the sensor unit 43 includes a first sensor 43a, a second sensor 43b, and a dichroic mirror 43c. The dichroic mirror 43c is composed of a dielectric multilayer film, and transmits the fluorescent light YL of the illumination light WL while reflecting the blue light BLp of the illumination light WL.

The first sensor 43a detects the light amount of the blue light BLp reflected by the dichroic mirror 43c. The second sensor 43b detects the light amount of the fluorescent light YL transmitted through the dichroic mirror 43c. The first sensor 43a and the second sensor 43b are electrically connected with the controller CONT, and transmit detection results to the controller CONT. The controller CONT controls, based on the detection results of the first sensor 43a and the second sensor 43b, the movement of the phosphor wheel 110 as will be described later.

As shown in FIG. 4, the light-amount monitoring mirror 42 is held by a holding member 48 disposed to avoid a plurality of light-incident regions R of the polarization conversion element 32. The light-incident region R of the polarization conversion element 32 is a region on which each of the plurality of small light beams emitted through the integrator optical system 31 is incident.

Since the second lens array 31b and the array light source 21 are in conjugate relationship with each other, a secondary light source image Z of the excitation light BL is formed on each of the plurality of lenses included in the second lens array 31b. The light-amount monitoring mirror 42 is disposed such that one secondary light source image Z of the plurality of secondary light source images Z formed on the second lens array 31b is incident on the light-amount monitoring mirror 42. Herein, an example in which the light-amount monitoring mirror 42 is disposed on the optical path between the integrator optical system 31 and the polarization conversion element 32 has been shown. Instead of this example, the light-amount monitoring mirror 42 may be disposed on the optical path between the polarization conversion element 32 and a superimposing lens 33a.

The illumination light WL that is transmitted through the polarization conversion element 32 and thus whose polarization direction is aligned is incident on the superimposing lens 33a. The superimposing lens 33a superimposes the plurality of small light beams emitted through the polarization conversion element 32 on each other on the object to be illuminated. With this configuration, the object to be illuminated can be uniformly illuminated. The superimposing optical system 33 is composed of the integrator optical system 31 including the first lens array 31a and the second lens array 31b, and the superimposing lens 33a.

In the embodiment, the light-amount monitoring mirror 42 is disposed at a position at which the secondary light source image Z is incident, on the optical path between the integrator optical system 31 and the polarization conversion element 32. Therefore, even if the light-amount monitoring mirror 42 is disposed on the optical path to extract portion of light, illuminance unevenness does not occur on the light modulator 4R for red light, the light modulator 4G for green light, and the light modulator 4B for blue light as the regions to be illuminated. Hence, if a reduction in illuminance corresponding to one secondary light source image can be allowed, the light-amount monitoring mirror 42 does not have to be a mirror that transmits portion of light and reflects the remaining portion thereof but may be a mirror that reflects all light.

Subsequently, the phosphor wheel 110 will be described in detail.

In the embodiment, the wavelength conversion layer 20 of the phosphor wheel 110 has the distribution of reflectance with respect to the excitation light BLc along a circle centered on the axis O of rotation. The distribution of reflectance with respect to the excitation light BLc is defined by the dichroic film 13 to be described later.

Figure 5:
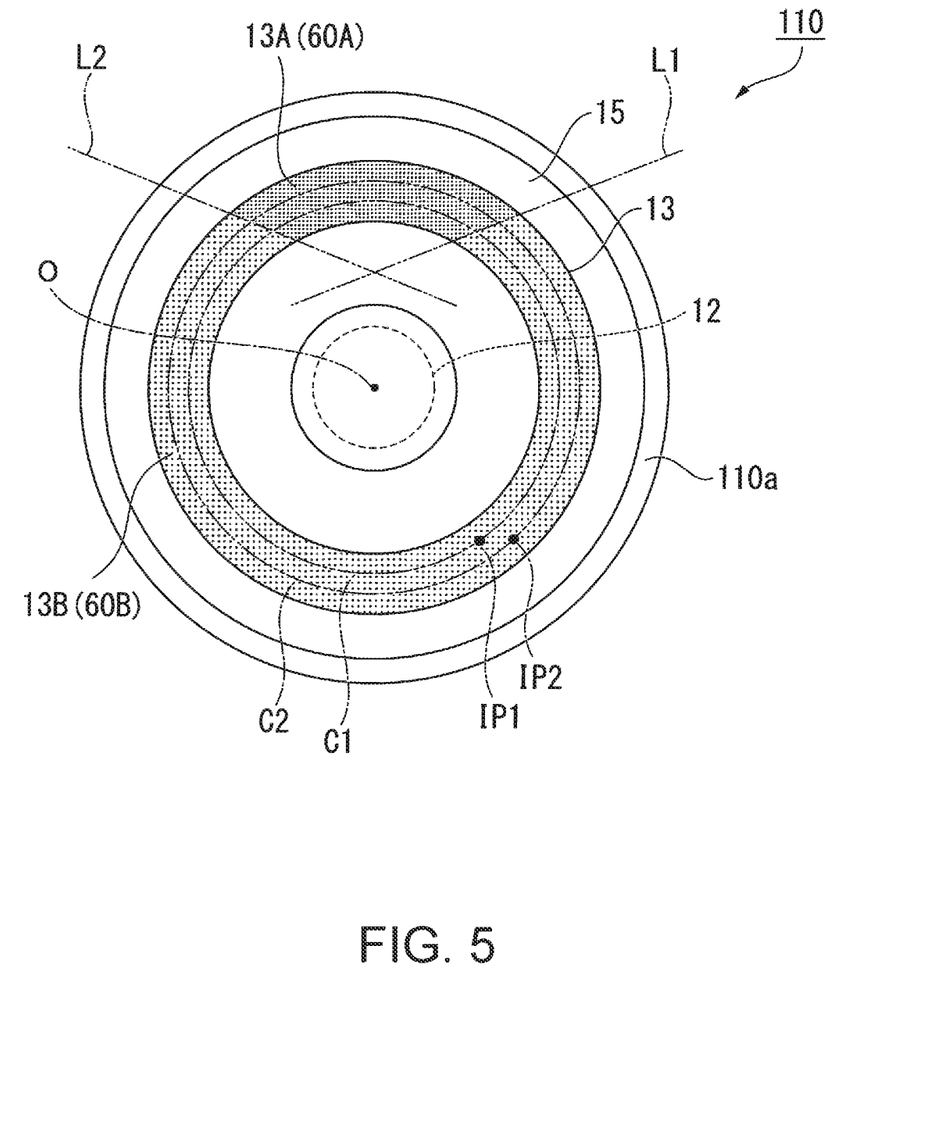
FIG. 5 is a top view showing a configuration of a main portion of a phosphor wheel.

FIG. 5 is a top view showing a configuration of a main portion of the phosphor wheel 110. FIG. 5 shows a planar configuration of the wavelength conversion layer 20.

In the embodiment, since the phosphor wheel 110 is rotatably driven by the motor 12, the incident position of the excitation light BLc on the dichroic film 13 traces a circle centered on the axis O of rotation of the substrate 110a. For convenience of description, in FIG. 5, a first incident position is denoted by reference sign IP1, and a circle traced by the first incident position IP1 is represented by a circle C1.

As shown in FIG. 5, the wavelength conversion layer 20 includes a high reflectance region 60A and a low reflectance region 60B where the reflectance is smaller than that of the high reflectance region 60A. The high reflectance region 60A and the low reflectance region 60B are composed of the dichroic film 13.

As shown in FIG. 5, the dichroic film 13 includes a first dichroic film 13A provided in the high reflectance region 60A and a second dichroic film 13B provided in the low reflectance region 60B. In the embodiment, the first dichroic film 13A corresponds to "first dichroic layer" in the appended claims, while the second dichroic film 13B corresponds to "second dichroic layer" in the appended claims.

The film configuration of the first dichroic film 13A is different from the film configuration of the second dichroic film 13B. Since the reflectance can be increased or reduced by changing the film configuration of the dichroic film, a required reflectance can be easily realized.

The average reflectance with respect to the excitation light BLc per circle C1 can be obtained from the proportion of the first dichroic film 13A and the proportion of the second dichroic film 13B per circle C1.

Next, consider the case where the incident position of the excitation light BLc on the dichroic film 13 is moved from the first incident position IP1 to the second incident position IP2. In FIG. 5, a circle traced by the second incident position IP2 is represented by a circle C2. The center of the circle C1 and the center of the circle C2 are coincident with the axis O of rotation.

Two boundaries are present between the high reflectance region 60A and the low reflectance region 60B. A straight line including one of the boundaries is defined as a straight line L1, while a straight line including the other boundary is defined as a straight line L2. The straight line L1 and the straight line L2 pass through a point different from the axis O of rotation.

Therefore, as shown in FIG. 5, the proportion of the high reflectance region 60A per circle C1 is different from the proportion of the high reflectance region 60A per circle C2. Moreover, the proportion of the low reflectance region 60B per circle C1 is different from the proportion of the low reflectance region 60B per circle C2. That is, the ratio between the length of the high reflectance region 60A and the length of the low reflectance region 60B in the circle C1 is different from the ratio between the length of the high reflectance region 60A and the length of the low reflectance region 60B in the circle C2.

The average reflectance per circle C2 where the proportion of the high reflectance region 60A is relatively large is higher than the average reflectance per circle C1. That is, in the embodiment, the high reflectance region 60A and the low reflectance region 60B are provided such that the average reflectance becomes higher as the radius of the circle is larger.

In the wavelength conversion layer 20 as described above, the average reflectance with respect to the excitation light BLc per circle centered on the axis O of rotation varies depending on the radius of the circle.

In the embodiment, since the boundaries between the high reflectance region 60A and the low reflectance region 60B are straight lines, the average reflectance continuously changes depending on the radius of the circle.

Returning to FIG. 2, the drive device 50 can translate the phosphor wheel 110 in a direction crossing the optical axis ax1. The drive device 50 is electrically connected with the controller CONT, and the operation of the drive device 50 is controlled thereby. The controller CONT drives the drive device 50 based on the results transmitted from the sensor unit 43 (the first sensor 43a and the second sensor 43b) as described above. Then, the drive device 50 translates the phosphor wheel 110 in a predetermined direction.

The drive device 50 translates the phosphor wheel 110 in the direction crossing the axis O of rotation. The drive device 50 can locate the incident position of the excitation light BLc on a different circle by translating the phosphor wheel 110. The drive device 50 corresponds to "second drive device" in the appended claims.

Here, consider the case where the amount of light emitted from the semiconductor laser 21a is lowered due to aging in the use of the projector. The concept of a countermeasure of the embodiment against white-balance deviation occurring in this case will be described based on a flowchart in FIG. 6.

As the output of the semiconductor laser 21a is lowered (Step S1 in FIG. 6), the light amount of the excitation light BL to excite the phosphor layer 11 is lowered. The lowering of the light amount of the excitation light BL is equivalent to the lowering of the light density (light amount per unit area) of the excitation light BL (Step S2 in FIG. 6).

When the output of the semiconductor laser 21a is lowered, the light amount of the blue light BLp is also lowered. On the other hand, when the light density of the excitation light BLc is lowered with the lowering of output of the semiconductor laser 21a, the conversion efficiency of the phosphor layer 11 in converting the excitation light BLc to the fluorescent light YL generally increases. Hence, when the output of the semiconductor laser 21a is lowered, the ratio of the fluorescent light YL in the illumination light WL increases (Step S3 in FIG. 6). Herein, the case where the ratio of the fluorescent light YL in the illumination light WL increases is described by way of example, but the ratio may decrease in some cases. In any case, however, white balance is lost (Step S4 in FIG. 6). When the ratio of the fluorescent light YL in the illumination light WL increases, the illumination light WL changes to yellowish white light.

Figure 6:
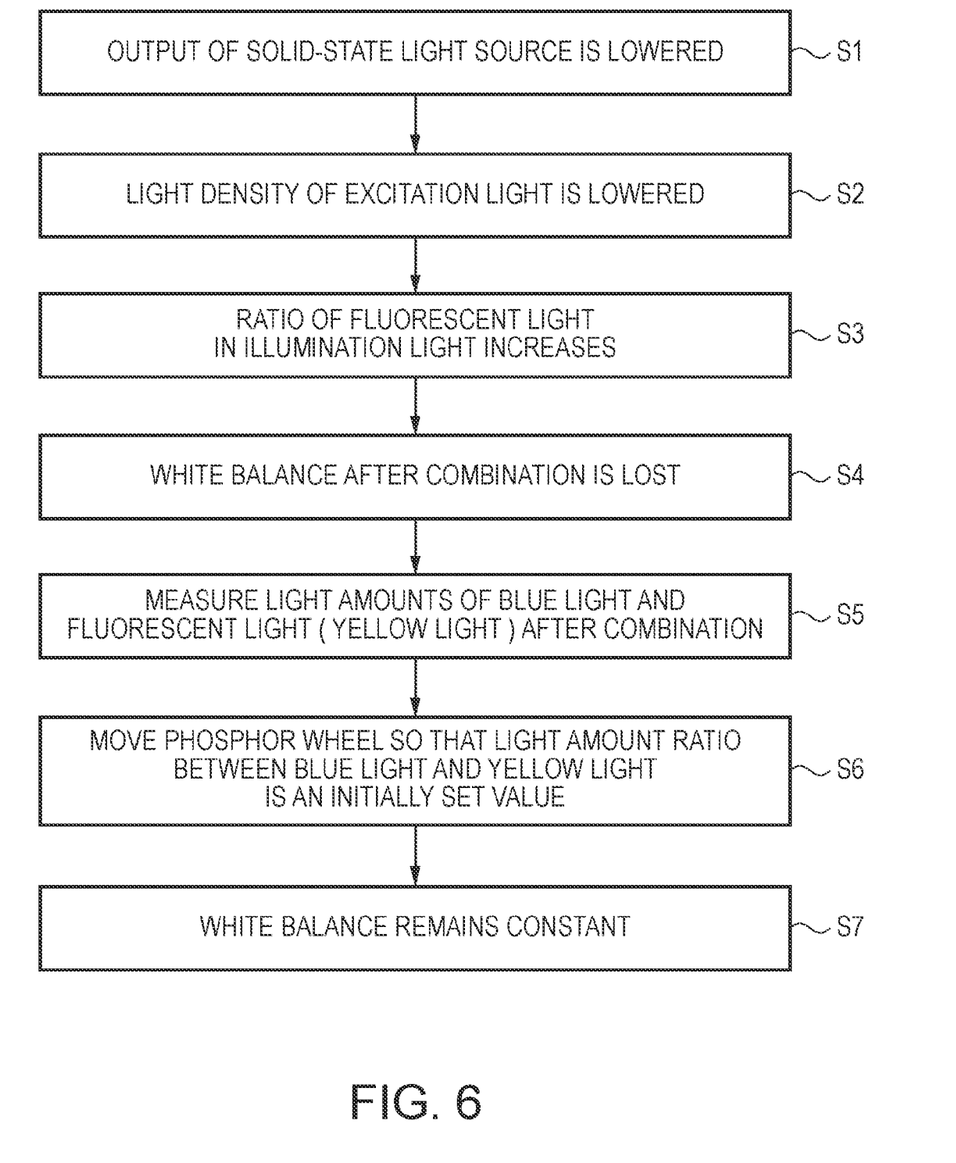
FIG. 6 is a flowchart showing the concept of adjustment of white balance.

In the embodiment, the light amount (intensity) of the blue light BLp and the light amount (intensity) of the yellow fluorescent light YL, which are included in the light extracted from the light-amount monitoring mirror 42, are measured by the sensor unit 43 (Step S5 in FIG. 6). The measurement results of the sensor unit 43 are transmitted to the controller CONT.

The controller CONT previously stores, as a reference value, the ratio (intensity ratio) between the intensity of the blue light BLp and the intensity of the fluorescent light YL, which is determined based on the initial intensity values at the time of beginning of use of the projector 1. The controller CONT compares a current intensity ratio detected by the sensor unit 43 with the reference value. When the difference between the current intensity ratio and the reference value exceeds the allowable range, the drive device 50 translates the phosphor wheel 110 to move the incident position of the excitation light BLc onto a circle having a different radius so that the intensity ratio is close to the reference value (Step S6 in FIG. 6). For example, the drive device 50 moves the incident position of the excitation light BLc from the circle C1 onto the circle C2.

By moving the incident position of the excitation light BLc in the radial direction of the phosphor wheel 110 as described above, the ratio between the light amounts of the fluorescent light YL and the blue light BLp that constitute the illumination light WL can be adjusted.

Specifically, for increasing the light amount of the blue light BLp while reducing the light amount of the fluorescent light YL, the amount of the excitation light BLc reflected by the dichroic film 13 is to be increased. That is, the phosphor wheel 110 is translated such that the incident position of the excitation light BLc is in a region of the dichroic film 13 that has a high average reflectance (on a circle having a large radius). That is, the substrate 110a is moved so as to move the incident position of the excitation light BLc from the circle C1 onto the circle C2.

This increases the amount of the blue light BLc1 reflected by the dichroic film 13 and thus reduces the amount of the fluorescent light YL emitted from the phosphor layer 11, resulting in a relative increase in the amount of the blue light BLp. This makes the illumination light WL as combined light more whitish compared with that when the white balance of white light is lost, so that the white balance can be improved (Step S7 in FIG. 6).

On the other hand, for reducing the light amount of the blue light BLp while increasing the light amount of the fluorescent light YL, the amount of the excitation light BLc reflected by the dichroic film 13 is to be reduced. That is, the phosphor wheel 110 is translated such that the incident position of the excitation light BLc is in a region of the dichroic film 13 that has a low average reflectance (on a circle having a small radius). That is, the substrate 110a is moved so as to move the incident position of the excitation light BLc from the circle C2 onto the circle C1.

This reduces the amount of the blue light BLc1 reflected by the dichroic film 13 and thus increases the amount of the fluorescent light YL emitted from the phosphor layer 11, resulting in a relative decrease in the amount of the blue light BLp. This makes the illumination light WL as combined light more whitish compared with that when the white balance of white light is lost, so that the white balance can be improved (Step S7 in FIG. 6).

As the timing of adjusting the white balance, the detections of the blue light intensity and the yellow light intensity and the translation of the phosphor wheel 110 are desirably set to be performed, for example, immediately after turning on the main power of the projector 1. The reason for that is that the configuration in which the adjustment is performed immediately after turning on the main power of the projector 1 makes it hard for the user to recognize a color change in image. However, if the adjustment of the white balance is performed only immediately after turning on the main power of the projector 1, white-balance deviation in the use of the projector 1 cannot be dealt with. Hence, a configuration in which the adjustment of the white balance is performed at a predetermined time interval even in the use of the projector 1 may be employed.

According to the phosphor wheel 110 of the embodiment as has been described above, even when two kinds of phosphor layers are not disposed side by side in the circumferential direction of the phosphor wheel 110, the color balance of light emitted from the wavelength conversion layer 20 can be adjusted by moving the incident position of the excitation light in the radial direction of the circle.

Thus, for example, it is not necessary to form the phosphor layer by processing plural kinds of phosphor layers and bonding the phosphor layers together, but it is sufficient to form the wavelength conversion layer 20 using only one kind of phosphor layer. Therefore, the configuration of the wavelength conversion layer 20 can be simplified.

Especially when a ceramic phosphor layer is used, it is very difficult to process plural kinds of phosphor layers into desired shapes and bond the phosphor layers together; however, when the phosphor layer 11 is composed of only one kind of phosphor layer as in the embodiment, it is very easy to manufacture the phosphor layer.

Moreover, in the phosphor wheel 110 of the embodiment, the color balance of the illumination light WL can be adjusted by moving the incident position of the excitation light BLc in the radial direction of the phosphor wheel 110. Moreover, since the reflectance of the dichroic film 13 with respect to the excitation light BLc continuously changes in the radial direction of the phosphor wheel 110, the above-described adjustment of the color balance can be accurately performed.

Moreover, the white balance can be adjusted by controlling the incident position of the excitation light BLc on the dichroic film 13 based on the light intensities of the blue light BLp and the fluorescent light YL that are detected by the sensor unit 43.

Moreover, since the detection is performed by extracting a portion of the plurality of secondary light source images with the light-amount monitoring mirror 42, the adjustment of the white balance can be accurately performed without causing illuminance unevenness on the light modulator 4R for red light, the light modulator 4G for green light, and the light modulator 4B for blue light.

Moreover, according to the projector 1 of the embodiment, since the illumination device 2 is included, display with white balance remaining constant can be performed.

The invention is not necessarily limited to those in the embodiments, but various modifications can be added within the scope not departing from the gist of the invention.

For example, in the embodiment, the case where the straight line including the boundary between the high reflectance region 60A and the low reflectance region 60B does not pass through the center of the circle has been exemplified. However, the invention is not limited to this, and a configuration in which the straight line including the boundary passes through the center of the circle may be employed.

Figure 7:
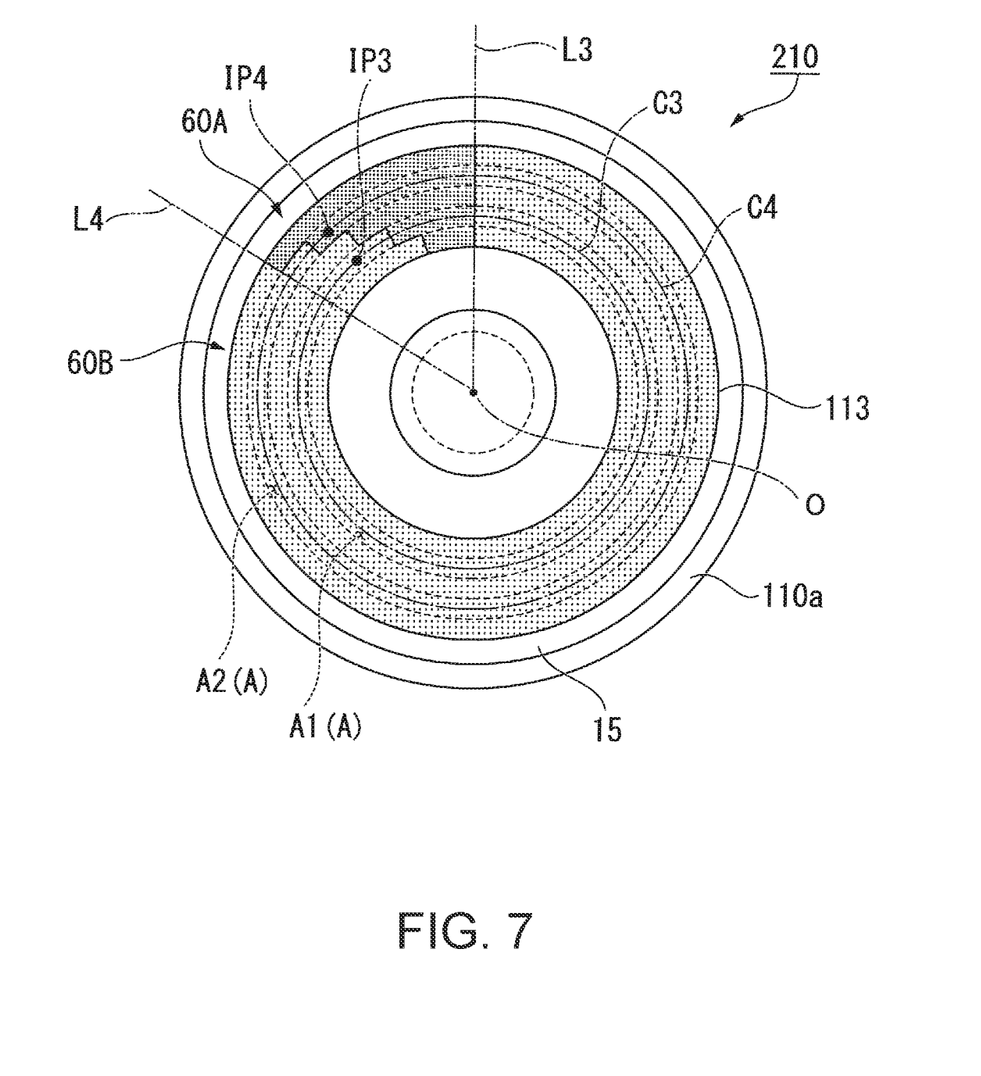
FIG. 7 is a top view showing a configuration of a main portion of a phosphor wheel according to a modified example.

FIG. 7 is a top view showing a configuration of a main portion of a phosphor wheel 210 according to a modified example. In FIG. 7, members common to the embodiment are denoted by the same reference numerals and signs.

In FIG. 7, a dichroic film 113 of the phosphor wheel 210 includes a plurality of regions A having a ring shape centered on the axis O of rotation of the substrate 110*a*. Each of the regions A is composed of the high reflectance region 60A and the low reflectance region 60B. The radii of the regions A are different from each other. Here, the radius of the region A is defined by the distance between the axis O of rotation and the radial center of the region A.

The incident position of the excitation light BLc on the dichroic film 113 traces a circle centered on the axis O of rotation of the substrate 110*a*. In FIG. 7, a third incident position of the excitation light BLc is denoted by reference sign IP3, a fourth incident position of the excitation light BLc is denoted by reference sign IP4, a circle traced by the third incident position is represented by a circle C3, and a circle traced by the fourth incident position is represented by a circle C4.

A straight line including one of boundaries between the high reflectance region 60A and the low reflectance region 60B in the circumferential direction of the phosphor wheel 210 is defined as a straight line L3. In the modified example, the straight line L3 passes through the axis O of rotation. On the other hand, the other boundary between the high reflectance region 60A and the low reflectance region 60B has a stepwise shape. A straight line including the other boundary in one region A is defined as a straight line L4. Also the straight line L4 passes through the axis O of rotation.

In the modified example, the ratio between the high reflectance region 60A and the low reflectance region 60B is different in each of the regions A. Specifically, as shown in FIG. 7, a second region A2 that is located radially outward in the plurality of regions A has a large proportion of the high reflectance region 60A compared with a first region A1 that is located radially inward.

Therefore, the average reflectance per circle C4 traced by the fourth incident position IP4 in the second region A2 is higher than the average reflectance per circle C3 traced by the third incident position IP3 in the first region A1.

According to the modified example as described above, the average reflectance with respect to the excitation light BLc in the wavelength conversion layer 20 becomes higher as the region A goes radially outward of the wavelength conversion layer 20. That is, in the modified example, the white balance of the illumination light WL can be adjusted, as in the embodiment described above, by moving the incident position of the excitation light BLc among the plurality of regions A.

Moreover, the case where the two boundaries between the high reflectance region 60A and the low reflectance region 60B in the circumferential direction of the dichroic film 13 are straight lines (see FIG. 5) has been exemplified in the embodiment, but the invention is not limited to this. For example, both boundaries may be formed in a stepwise shape like the boundary on the other side shown in FIG. 7.

Moreover, the case where the high reflectance region 60A and the low reflectance region 60B are composed of the dichroic film 13 has been exemplified in the embodiment, but the invention is not limited to this. For example, the dichroic film may be disposed only in the high reflectance region 60A, and the dichroic film may not be disposed in the low reflectance region 60B.

A digital micromirror device or the like may be used as a light modulator in the projector. An example in which the illumination device according to the invention is applied to the projector has been shown in the embodiment, but the invention is not limited to this. The illumination device according to the invention can be applied also to a luminaire such as a headlight for an automobile.

The entire disclosure of Japanese Patent Application No. 2016-025165, filed on Feb. 12, 2016 is expressly incorporated by reference herein.

What is claimed is:

1. A wavelength conversion element comprising:
    a substrate including a first surface and rotatable around an axis of rotation;
    a light-reflecting layer provided on the first surface; and
    a wavelength conversion layer provided on the light-reflecting layer, wherein:
    the wavelength conversion layer includes a first region having a first reflectance with respect to the excitation light to excite the wavelength conversion layer and a second region having a second reflectance with respect to the excitation light,
    the second reflectance is smaller than the first reflectance,
    the first region and the second region are provided along a circle centered on the axis of rotation, and
    an average reflectance of the wavelength conversion layer with respect to the excitation light varies depending on a radius of the circle.

2. The wavelength conversion element according to claim 1, wherein
    a proportion of the first region and a proportion of the second region vary depending on the radius of the circle.

3. The wavelength conversion element according to claim 2, wherein
    a straight line including a boundary between the first region and the second region passes through a point different from a center of the circle.

4. An illumination device comprising:
    the wavelength conversion element according to claim 3;
    a first drive device rotating the substrate around the axis of rotation;
    a second drive device moving the substrate in a direction crossing the axis of rotation; and
    a light-emitting element emitting the excitation light to be incident on the wavelength conversion layer,
    the illumination device emitting illumination light including a component of portion of the excitation light reflected by the wavelength conversion layer and fluorescence produced by the wavelength conversion layer.

5. An illumination device comprising:
    the wavelength conversion element according to claim 2;
    a first drive device rotating the substrate around the axis of rotation;
    a second drive device moving the substrate in a direction crossing the axis of rotation; and
    a light-emitting element emitting the excitation light to be incident on the wavelength conversion layer,
    the illumination device emitting illumination light including a component of portion of the excitation light reflected by the wavelength conversion layer and fluorescence produced by the wavelength conversion layer.

6. The wavelength conversion element according to claim 1, wherein the wavelength conversion layer includes a first dichroic layer provided on the side of the wavelength conversion layer opposite to the first surface of the substrate, the first dichroic layer is provided on the first region, and the first dichroic layer reflects portion of the excitation light and transmits fluorescence produced by the wavelength conversion layer.

7. An illumination device comprising:

the wavelength conversion element according to claim 6;

a first drive device rotating the substrate around the axis of rotation;

a second drive device moving the substrate in a direction crossing the axis of rotation; and a light-emitting element emitting the excitation light to be incident on the wavelength conversion layer, the illumination device emitting illumination light including a component of portion of the excitation light reflected by the wavelength conversion layer and fluorescence produced by the wavelength conversion layer.

8. The wavelength conversion element according to claim 1, wherein the wavelength conversion layer includes, in the low reflectance region, a second dichroic layer provided on the side of the wavelength conversion layer opposite to the first surface of the substrate, the second dichroic layer is provided on the second region, and the second dichroic layer reflects portion of the excitation light and transmits the fluorescence produced by the wavelength conversion layer.

9. An illumination device comprising:

the wavelength conversion element according to claim 8;

a first drive device rotating the substrate around the axis of rotation;

a second drive device moving the substrate in a direction crossing the axis of rotation; and a light-emitting element emitting the excitation light to be incident on the wavelength conversion layer, the illumination device emitting illumination light including a component of portion of the excitation light reflected by the wavelength conversion layer and fluorescence produced by the wavelength conversion layer.

10. The wavelength conversion element according to claim 1, wherein a straight line including a boundary between the first region and the second region passes through a center of the circle.

11. An illumination device comprising:

the wavelength conversion element according to claim 10;

a first drive device rotating the substrate around the axis of rotation;

a second drive device moving the substrate in a direction crossing the axis of rotation; and a light-emitting element emitting the excitation light to be incident on the wavelength conversion layer, the illumination device emitting illumination light including a component of portion of the excitation light reflected by the wavelength conversion layer and fluorescence produced by the wavelength conversion layer.

12. An illumination device comprising:

the wavelength conversion element according to claim 1;

a first drive device rotating the substrate around the axis of rotation;

a second drive device moving the substrate in a direction crossing the axis of rotation; and a light-emitting element emitting the excitation light to be incident on the wavelength conversion layer, the illumination device emitting illumination light including a component of portion of the excitation light reflected by the wavelength conversion layer and fluorescence produced by the wavelength conversion layer.

13. The illumination device according to claim 12, further comprising:

a detection section detecting a light amount of the illumination light; and a controller controlling the second drive device based on a detection result of the detection section.

14. A projector comprising:

the illumination device according to claim 13;

a light modulator modulating light from the illumination device in response to image information to thereby form image light; and a projection optical system projecting the image light.

15. A projector comprising:

the illumination device according to claim 12;

a light modulator modulating light from the illumination device in response to image information to thereby form image light; and a projection optical system projecting the image light.

* * * * *